(12) United States Patent
Fleming (10) Patent No.: US 8,371,247 B2
(45) Date of Patent: Feb. 12, 2013

(54) HANDHELD DEVICE FOR CLEANING AN ANIMAL'S PAW AND METHOD OF USE

(76) Inventor: Kevin Fleming, Kansas City, MO (US)

( * ) Notice: Subject to any disclaimer, the term of this patent is extended or adjusted under 35 U.S.C. 154(b) by 103 days.

(21) Appl. No.: 12/690,736

(22) Filed: Jan. 20, 2010

(65) Prior Publication Data

US 2010/0180831 A1    Jul. 22, 2010

Related U.S. Application Data

(60) Provisional application No. 61/205,379, filed on Jan. 21, 2009.

(51) Int. Cl.
*A01K 29/00* (2006.01)
(52) U.S. Cl. .......................................... 119/652; 119/673
(58) Field of Classification Search .................. 119/651, 119/652, 650, 673, 600, 601; 215/247, 249, 215/250; 15/104.92
See application file for complete search history.

(56) References Cited

U.S. PATENT DOCUMENTS

| | | | |
|---|---|---|---|
| 4,734,952 A * | 4/1988 | Parchment et al. | 15/104.92 |
| 6,269,512 B1 | 8/2001 | Thompson et al. | |
| 6,439,160 B1 | 8/2002 | Wheelwright | |
| 6,851,391 B1 | 2/2005 | Mulich et al. | |
| 7,111,585 B2 | 9/2006 | Hale et al. | |
| 7,302,915 B2 | 12/2007 | Leary et al. | |
| 2001/0041336 A1 * | 11/2001 | Anderson et al. | 435/6 |

* cited by examiner

*Primary Examiner* — T. Nguyen
(74) *Attorney, Agent, or Firm* — Polsinelli Shughart PC (57) ABSTRACT

The present invention relates to a device for cleaning an animal's paw. Specifically, the paw cleaning device easily and efficiently removes dirt and debris from the paw of a pet. The paw cleaning device includes an elongated body with a splashguard designed to receive the paw of a pet and further the method for using the paw cleaning device to clean the pet's paw.

8 Claims, 7 Drawing Sheets

HANDHELD DEVICE FOR CLEANING AN ANIMAL'S PAW AND METHOD OF USE

RELATED APPLICATIONS

This application relates to and claims priority to U.S. Provisional Patent Application No. 61/205,379, which was filed Jan. 21, 2009 and is incorporated herein by reference in its entirety.

FIELD OF THE INVENTION

The present invention generally relates to a handheld cleaning device for washing an animal. More particularly the invention relates to a handheld cleaning device for individually washing an animal's paw and method of using the same.

BACKGROUND OF THE INVENTION

The number of U.S. households that include an animal continues to rise. These households typically include at least one companion animal such as a dog or cat. In many instances companion animals are viewed as part of the family and spend more time in the home than outside. This desire by pet owners to have their animals close presents one major problem, especially with dogs, pets tend to track dirt and mud into an owner's home. In addition to dirt a pet could also track in chemicals or other harmful substances. The soiling of a pet's paws is a necessary evil since it is almost always unavoidable that a pet, especially a dog, must be let outside for excrement of bodily waste and exercise. Because a pet typically goes outside a few times a day it is unavoidable that the pet's paws will become soiled from time to time which then leads to dirt and debris tracked into the home.

Traditionally and still currently used by many pet owners, the pet owners are required to bath the entire animal or manually wash each paw by hand with water and a towel. This scenario is neither easy nor efficient. Both require an investment of time and typically results in the failed attempt at limiting the pet's movement only to end up with a partially clean pet and either water all over the floor of the home or soiled and dirty dripping towels. Therefore a need exists for a convenient device that allows a pet owner to easily and efficiently wash the paws of a pet.

Additionally, various devices have been proposed that are designed to wash the paws of an animal. These devices in certain instances are passive cleaning devices that require the animal to walk into or place the animal's paws in a basin and then utilizes reciprocating brushes or other cleaning elements such as foam and sponge like materials to clean the paws. These devices may clean the pads of the paw, but any dirt or mud that is on the upper surface of the paw or slightly up the lower leg of the pet will not make contact with the cleaning elements and therefore remain. Additionally, these devices do not always work well at keeping the water and cleaning material in a basin when cleaning an excited pet, nor are they easily transportable or easy to store. Further, some past devices have been designed to fit over the paw, but each of these are cumbersome and difficult to use. These devises also have numerous parts and pieces that require constant cleaning and maintenance. These devices are not designed to prevent the water or cleaning agents from splashing out of the devices, which is of particular concern when dealing with an animal with unpredictable behavior.

Therefore a need exists for a handheld cleaning device that easily and efficiently cleans an animal's paw. The handheld device allows a pet owner to hold a single product and easily clean the animal's paw without spilling or splashing water or cleaning elements during the cleaning process. Further, the need exists for a device that can easily be cleaned and stored for later use and designed to handle rough use that is typically present when the cleaning of an animal is desired.

SUMMARY OF THE INVENTION

The present invention relates to a device that easily and efficiently cleans the paws of an animal. The paw cleaning device is designed to receive the paw and partial arm of the pet and by shaking the paw cleaning device the water and cleaning agent contained within removes the dirt and debris found on the animal's paws. The specific design allows a user to clean the animal's paw with a single hand, and also reduces the loss of water or cleaning materials that usually are spilt on the floor when other cleaning devices are used.

The paw cleaning device is configured to include an elongated body, with one closed end and an open end. The configuration of the elongated body is designed to include an open space, where the user will place water or other cleaning materials to clean the paw of the pet. The paw cleaning device further includes a splashguard that is configured for communication and fits over the open end of the elongated body. The splashguard can be fixedly attached and whereby creates a semi-seal over the open end of the paw cleaning device. The splashguard is designed with a hole and at least one groove to allow the receipt and insertion of the animal's paw through the splashguard and into the open space of the paw cleaning device.

The paw cleaning device is designed to overcome the short coming of previous devices used by pet owners to clean their pet's paws. A further detailed analysis of the paw cleaning device follows.

DETAILED DESCRIPTION

The present invention relates to a device for cleaning the paws of an animal. The paw cleaning device 10, is used by pet owners to easily and efficiently remove dirt and debris from a pet's paw. The design of the paw cleaning device 10 allows for single handed use in cleaning the pet's paw, but with minimal loss of water from the container during the cleaning process, even when vigorously shaking the paw cleaning device for the removal of dirt and debris.

Figure 1:
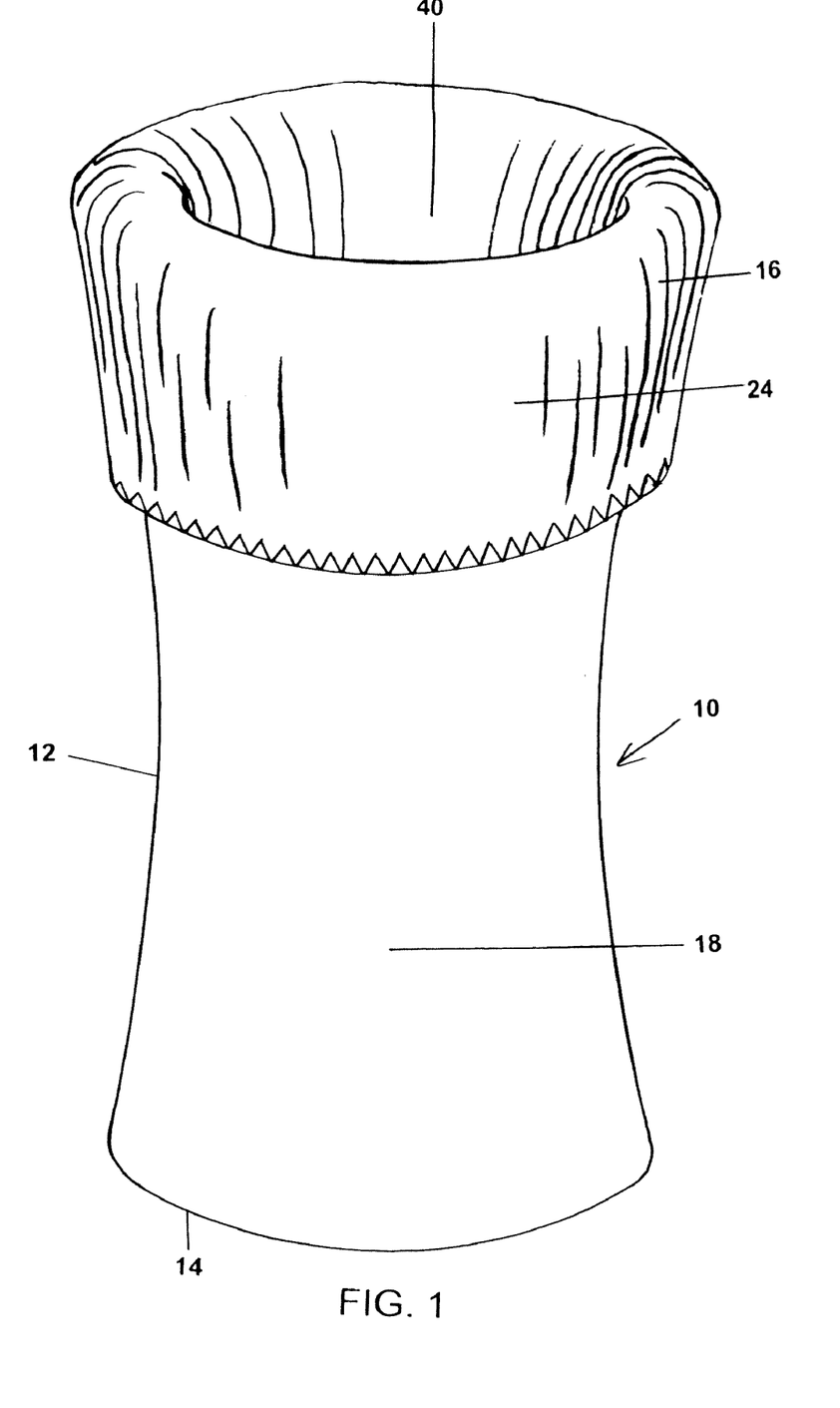
FIG. 1 is a perspective view of the paw cleaning device.
Figure 2:
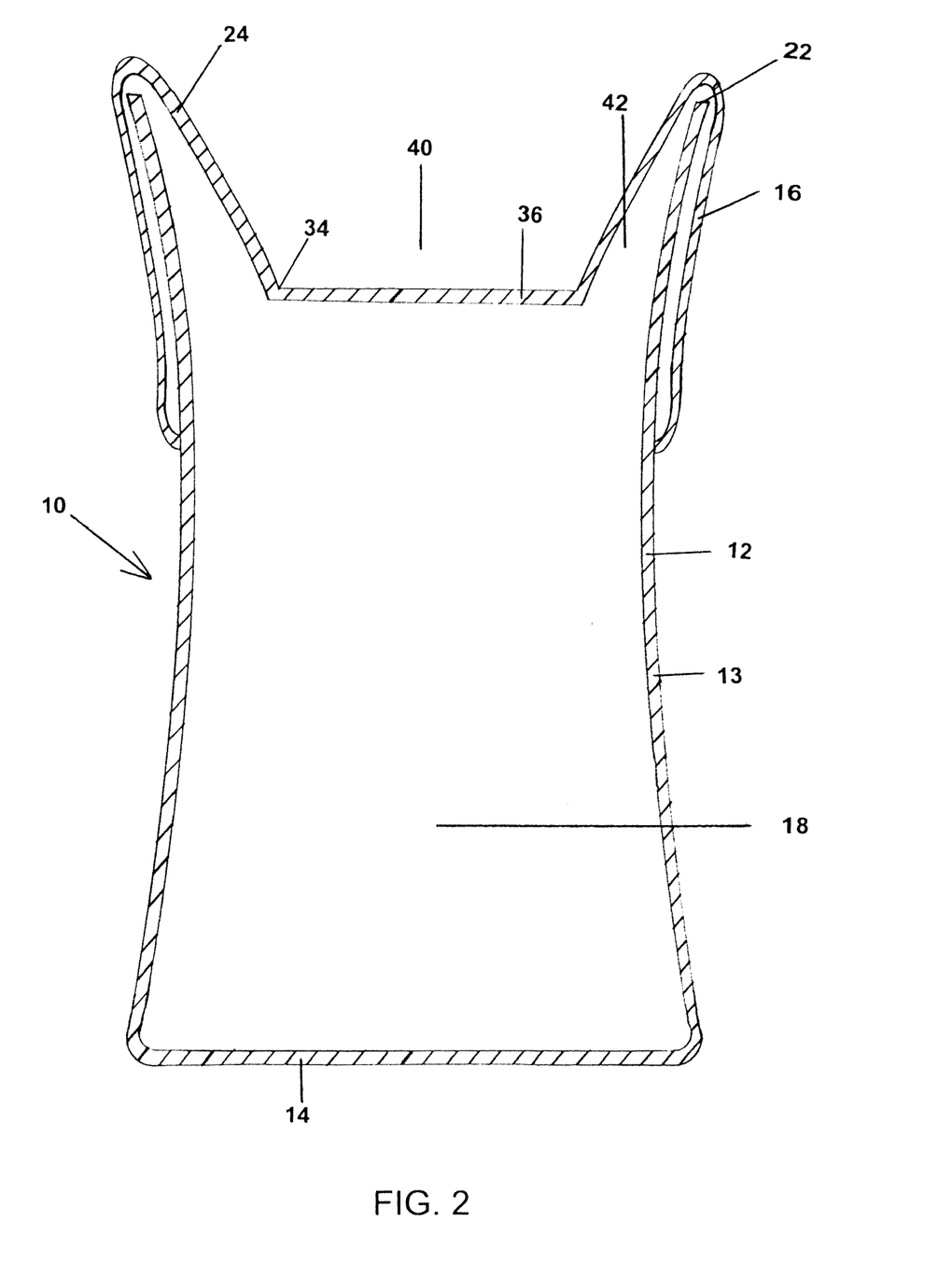
FIG. 2 is a cutaway view of the embodiment illustrated in FIG. 1.
Figure 3:
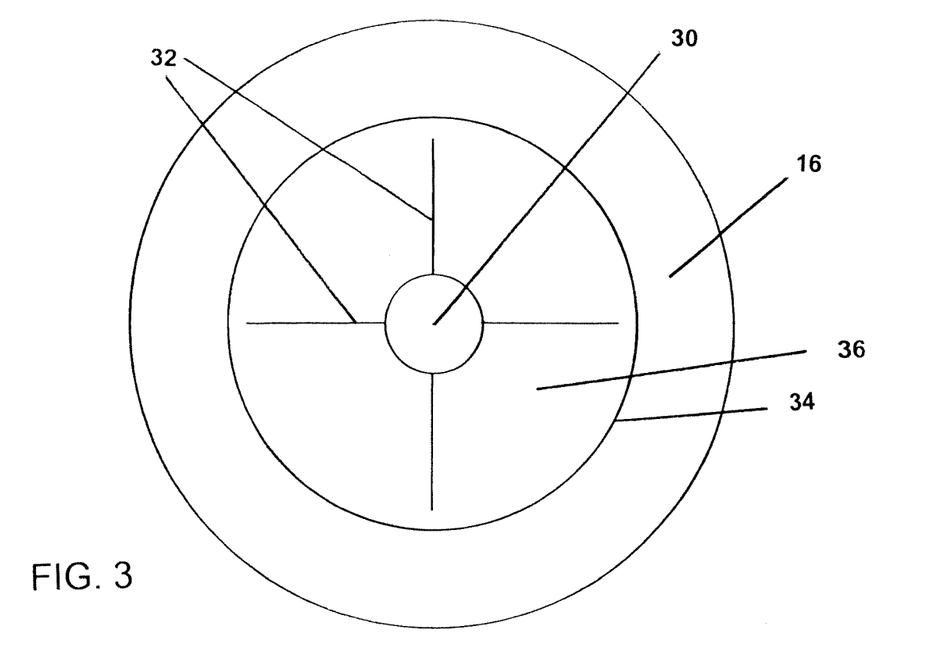
FIG. 3 is a top view of the paw cleaning device.
Figure 4:
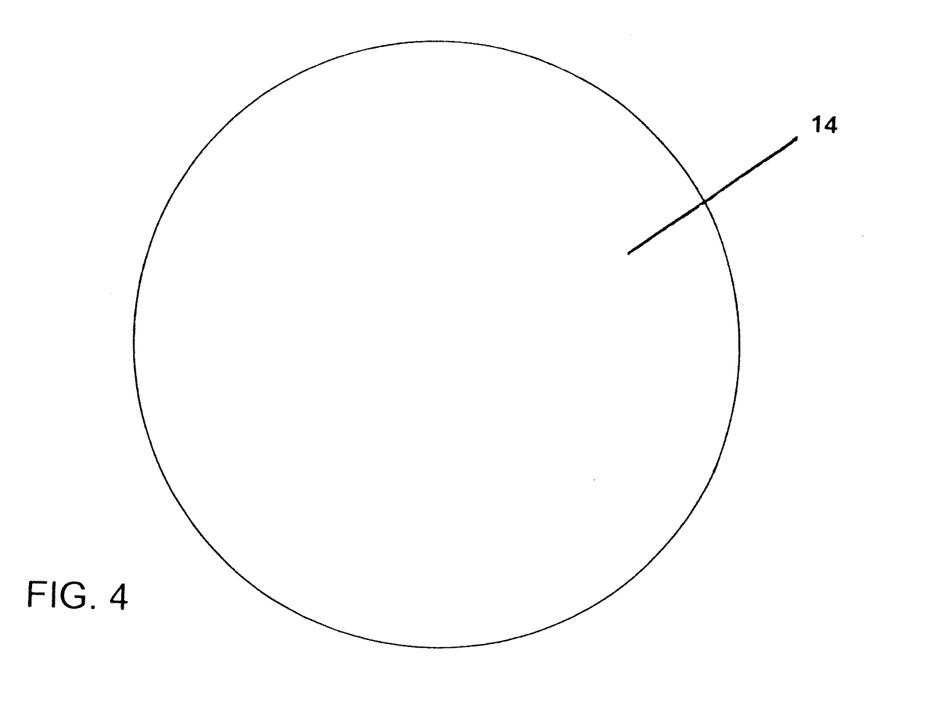
FIG. 4 is a bottom view of the paw cleaning device.

The paw cleaning device 10, is configured to include an elongated body 12, with one closed end 14 and an open end 22. The configuration of the elongated body 12, is designed to include an open space 18. The elongated body 12 is further configured for communication with a splashguard 24. The complete paw cleaning device 10, is best shown in FIGS. 1 and 2, or in use of FIG. 9.

Figure 5:
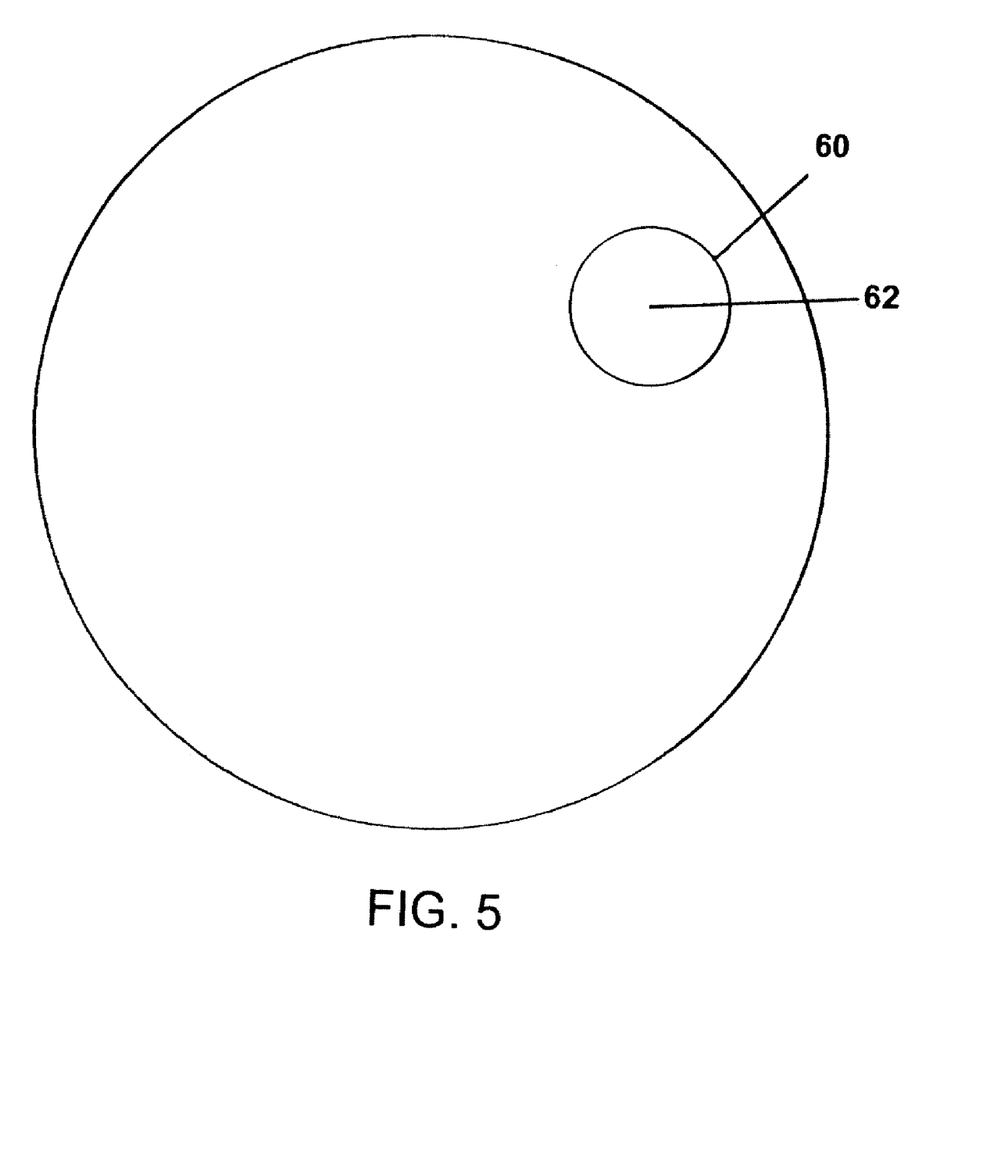
FIG. 5 is an alternative embodiment of the bottom view of the paw cleaning device.
Figure 6:
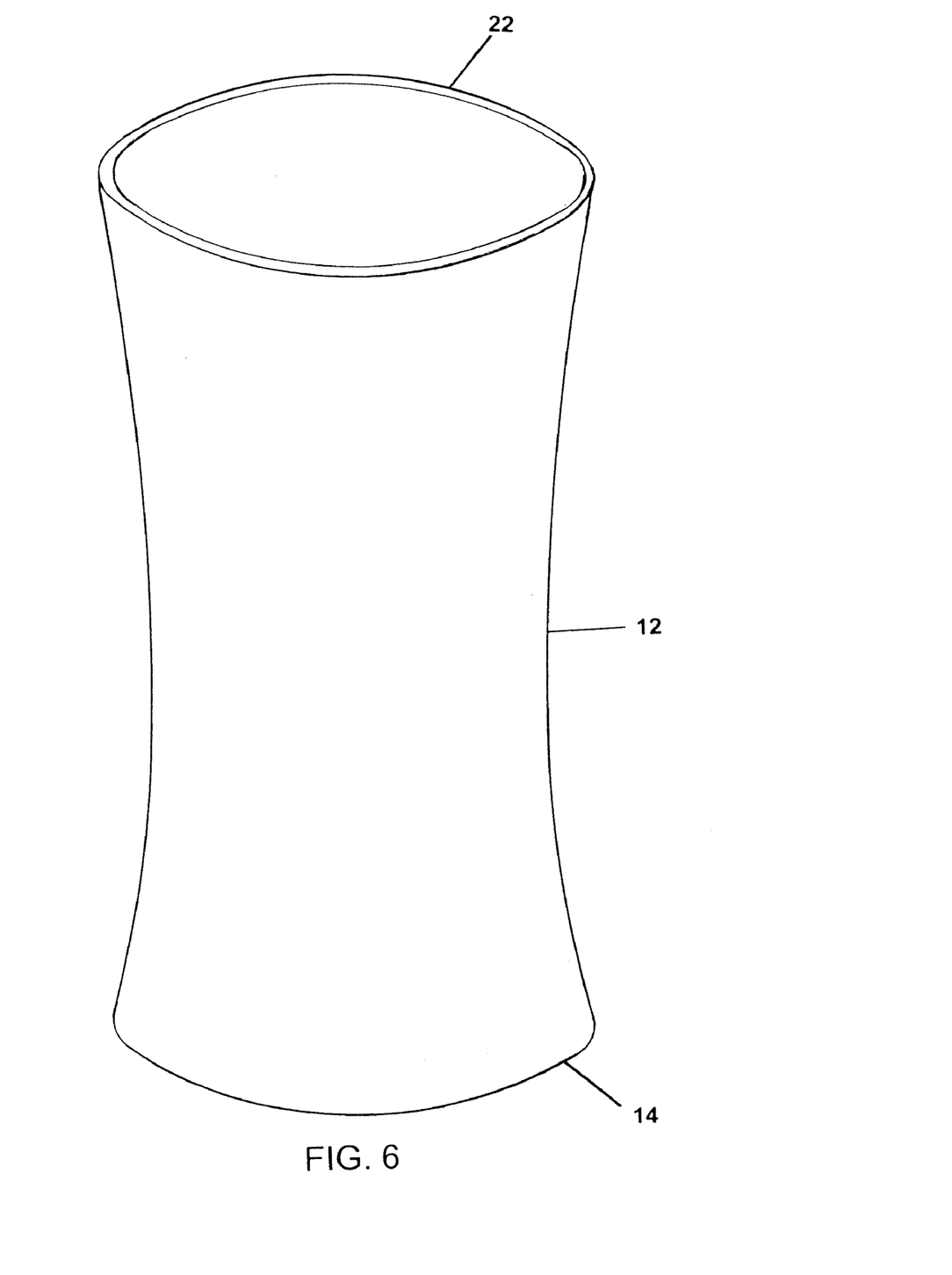
FIG. 6 is a perspective view of the elongated body of the paw cleaning device.
Figure 7:
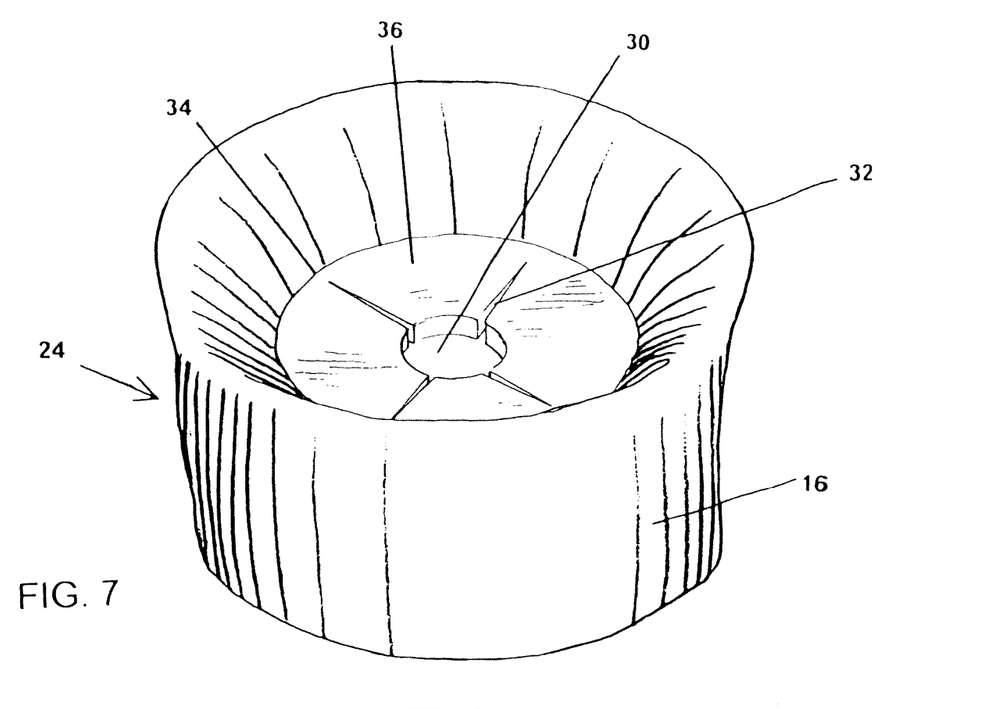
FIG. 7 is a perspective view of the splashguard of the paw cleaning device configured with the wall of the splashguard folded down.
Figure 8:
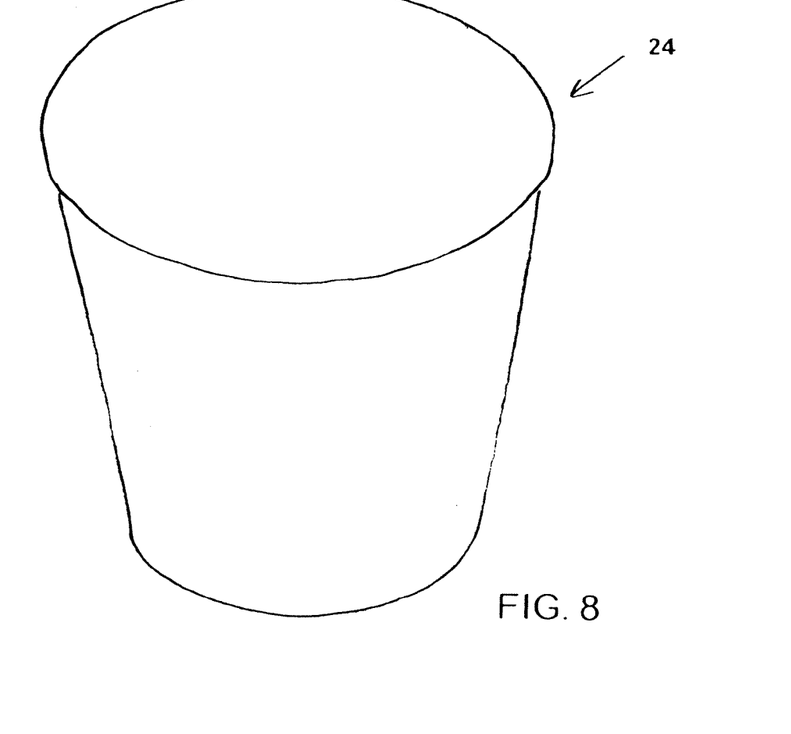
FIG. 8 is a perspective view of the splashguard of the paw cleaning device with the wall of the splashguard unfolded.

The elongated body 12 has one closed end 14 and an open end 22 creating an open space 18 within the side wall 13 of the elongated body 12. In one embodiment, the elongated body 12 is tubular in shape. In other embodiments the shape of the elongated body 12 can be a variety of shapes including square, rectangular, or any shape with walls creating an elongated body 12 with an interior open space 18. The open space 18 is configured to receive and hold water or cleaning materials, such as soap, and further receive the paw of the animal for cleaning. In one embodiment the elongated body 12 will include a closed end 14, an open end 22 and side wall 13, where the elongated body 12 is created out of a single piece of material without seams. In a further embodiment, the elongated body 12 including the closed end 14 and side wall 13 can be created out of a plurality of pieces that are configured to be fixedly attached together to form a watertight elongated body 12 with a watertight seal between the side wall 13 and the closed end 14. In another embodiment the closed end 14 can further include a hole member 60 configured to allow easy emptying of water or cleaning materials contained within the open space 18 of the elongated body 12. The configuration of the hole member 60 (see FIG. 5) can be a variety of sizes and shapes dependent on the desired end product so as to create an opening to allow one option for emptying and cleaning of the paw cleaning device 10. The hole member 60 further is configured to receive a plug member 62 that can be a variety of shapes and sizes dependent on the hole member 60. The plug member 62 can be made from any variety of materials, including but not limited to rubber, plastic, cork so as to create a watertight seal in the hole member 60 of the closed end 14.

The elongated body 12 has an open end 22 that in one embodiment is configured to flare away from the center between the open end 22 and the closed end 14. In this embodiment the elongated member 12 is configured where the side wall(s) 13 flare out from the center of the paw cleaning device 10. The side wall(s) 13 are configured so that the open end 22 and closed end 14 have a larger diameter than the mid point of the side wall(s) 13. This flare configuration is designed to allow a user to easily hold the paw cleaning device, provide a wider base at the closed end 14 for stability when the paw cleaning devices is positioned in an up right orientation, and to allow the open end to more readily communicate with and attach to the splash guard 24. In another embodiment the elongated body 12 and side wall(s) 13 are configured in a single plane and not tapered or flared at either end. In another embodiment the open end 22 will contain a rim that is configured to create a more secure connection with the splashguard 24.

The paw cleaning device 12 further includes a splashguard 24 configured to inhibit the loss of water or cleaning materials contained within the elongated body 12 from escaping during use (See FIGS. 1, 2, 7 and 8). The splashguard 24 is configured to slip over the open end 22 of the elongated body 12. By slipping over the open end 22 the splashguard 24 rests in communication with upper end of the side wall(s) 13 of the elongated body 12. In one embodiment the splashguard 24 is composed of a plurality of pieces configured to be connected and form the desired splashguard 24 that inhibits the release of water during the use of the paw cleaning device 10. The splashguard 24 is configured with a wall member 16 and a flat member 36. The wall member 16 and flat member 36 are configured in communication to form a seam 34. In one embodiment the seam is configured to be watertight to inhibit the loss of water when the paw cleaning device is in use. The seam 34 is configured to create a seal between the wall member 16 and flat member 36. In one embodiment, the flat member 36 further includes a hole member 30, to allow the insertion of the animal's paw for cleaning. In another embodiment the flat member 36 includes at least one groove member 32. In a further embodiment the flat member 36 includes a hole member 30 and at least one groove member 32. The hole member 30 and at least one groove member 32 are configured to receive the animal's paw for insertion of the paw into the paw cleaning device 10. The hole member 30 and groove member 32 can be varied in size and is dependent on the desired end product as long as it allows insertion of animal's paw. In another embodiment the flat member 36 can include a plurality of groove members 32.

The splashguard 24 is configured to communicate with the elongated body 12 of the paw cleaning device 10. In another embodiment the wall member 16 is folded over the open end 22 and the wall member 16 is configured to be fixedly attached to the side wall(s) 13 of the elongated body 12. In another embodiment the configuration of the splashguard 24 and elongated body 12 allow the elongated body to receive the splashguard and create a secure connection without the use of affixing materials. In one embodiment the splashguard 24 is fixedly attached by any means known in the industry including but not limited to glue, contact cement, or any means that will allow the attachment. In another embodiment the wall member 16 is configured to be removably attached to the elongated member 12. The splashguard 24 can be removably attached by any means known in the industry including tape, hook and loop attachment, buttons, or any means that allows a removable attachment. Connecting the splashguard 24 to the elongated body 12 creates a closed end over the open end 22. The folding of the wall member 16 of the splashguard 24 over the rim of the side wall(s) 13 of the elongated body 12, creates a void space 42, that is configured to minimize the escape of water and cleaning material from the paw cleaning device 10 when in use and further is configured to continually return the water to the open space 18 for further use (See FIG. 2). Additionally, folding the wall member 16 over the side wall(s) 13 creates a space 40 that is configured to receive the paw of the animal. The space 40 is dimensioned such that the flat member 36 is positioned below the top of the open end 22. In one embodiment the flat member 36 is positioned at least 0.5 inches below the top surface. In another embodiment the flat member 36 is positioned about 0.5 inches to about 4.0 inches below the top surface of the open end 22. In another embodiment the flat member is positioned on the same plane as the open end 22 of the elongated body 12. The space 40 in combination with the hole member 30 and groove member(s) 32 are configured to receive the paw of the animal as the animal or user inserts the paw of the animal into the open space 18 that includes the water and/or cleaning material. The hole member 30 and groove member(s) 32 are configured to create a barrier that inhibits the loss of water or cleaning material while the animal's paw is inserted into the paw cleaning device 10. The splashguard 24 in conjunction with the hole member 30 and groove member(s) 32 create a seal around the animal's leg inhibiting the loss of water from within the paw cleaning device 10 to the outside environment. The splashguard 24 is designed to allow the animal to insert a paw, the paw is then cleaned and finally after the paw is clean it is removed. The splashguard 24 position and design minimize potential harm to an animal's paw such as the claws, while in use.

The splashguard can be made from any of a variety of materials, including but not limited to polychloroprene, rubber, plastic, fabric, leather, and combinations thereof. The material selected should be non-toxic to humans and pets and easily cleaned. Further, the materials should be flexible in nature. In a further embodiment, the material should be water repellant or watertight in nature.

The elongated body 12 can be made from any of a variety of materials, including but not limited to plastic, rubber, metal, glass, and combinations thereof. The material selected should be non-toxic to humans and pets and easily cleaned. Further, the material should be structurally rigid to withstand the daily use with an animal.

Figure 9:
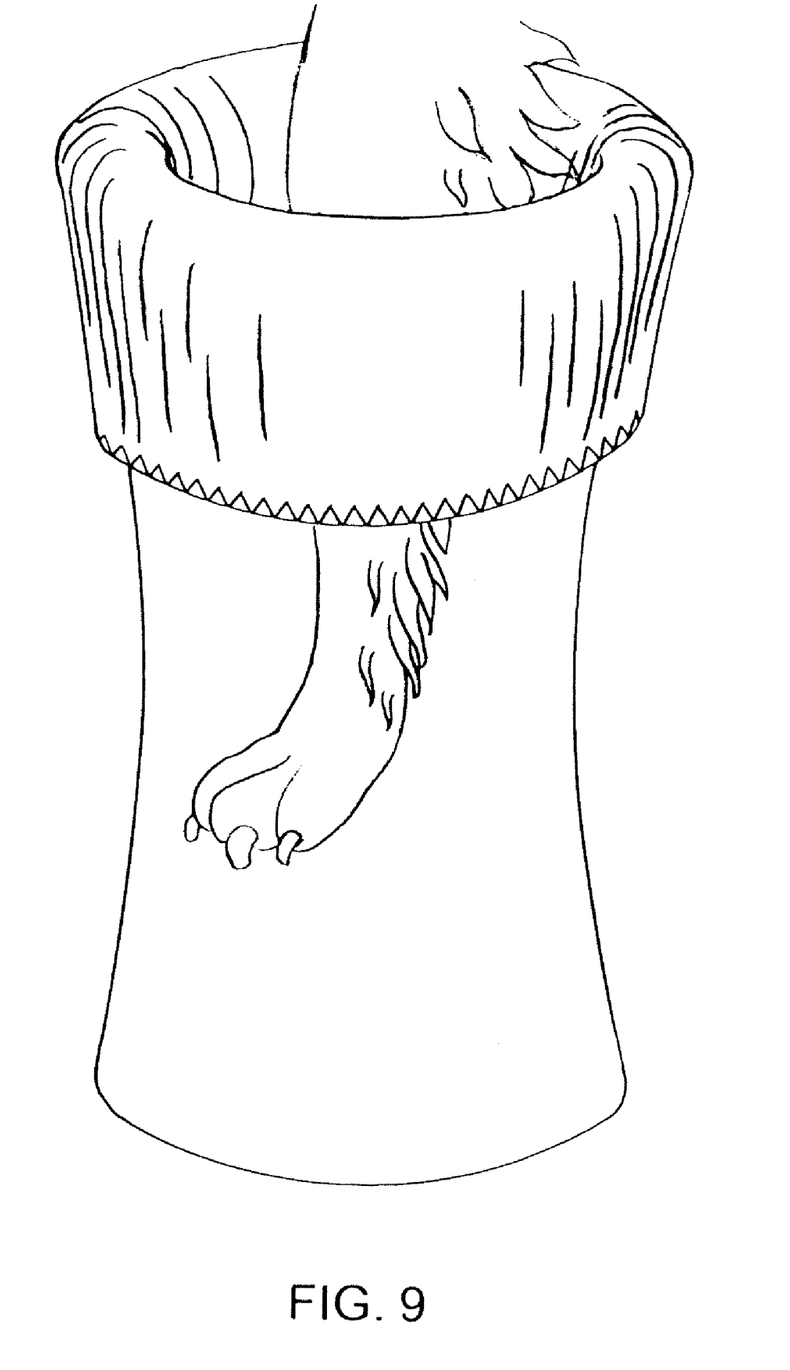
FIG. 9 is a perspective view of the paw cleaning device in use.

The invention also includes a method for cleaning the paw of an animal. In one embodiment the animal is a companion animal, which includes but is not limited to dogs and cats. FIG. 9 provides a demonstrative drawing of the method for using the paw cleaning device 10. To begin, a user will fill the paw cleaning device 14 with an amount of water and or cleaning material. The amount of cleaning material will depend on a variety of factors including the size of the paw to be cleaned as well as the degree to which the animal's paw is soiled. In one embodiment the amount of water added will partially fill the open space 18 of the paw cleaning device. After partially filling the paw cleaning device with water the user will insert the animal's paw through the hole member 30 into the open space 18. The splash guard 24 and specifically the flat member 36 will conform around the leg of animal creating a barrier that will inhibit the loss of water when the paw cleaning device 10 is in use. After the animal's paw is inserted into the open space 18 the user will vigorously shake the paw cleaning device 10 in a side-to-side or up-and-down action, causing the water to agitate and work as a solvent to loosen and remove any dirt and debris from the paw of the animal. The position of the splashguard 24 allows a user to insert the paw and clean without removal. The single insertion of the paw for cleaning minimizes any potential damage to the animal's paw, such as the claws. It should be noted that the space 42 acts to continually inhibit the loss of water out of the paw cleaning device and returns the water toward the center of the open space 18 where it can continue to remove dirt and debris from the paw of the animal. The animal's paw is then removed from the paw cleaning device and dried with a towel. As described the user only must insert the animals paw through the splashguard 24 once to clean the paw. The user can then continue cleaning the remainder of the animal's paws. After all the animals' paw are cleaned the paw cleaning device can be easily rinsed out for later use.

Thus, there has been shown and described a paw cleaning device which fulfills all the objects and advantages sought therefore. It is apparent to those skilled in the art, however that many changes, variations, modifications, and other uses and applications to the paw cleaning devices are possible, and also such changes, variations, modifications, and other uses and applications which do not depart from the spirit and scope of the invention are deemed to be covered by the invention.

Those skilled in the art will appreciate that variations from the specific embodiments disclosed above are contemplated by the invention. The invention should not be restricted to the above embodiments, but should be measured by the following claims.

What is claimed is:

1. A device for cleaning an animal's paw comprising:
   i. an elongated body having a closed lower end and an open upper end, wherein the elongated body is configured so that the side wall flares out from the center toward the upper end and lower end;
   ii. a splashguard having at least one groove and includes a hole, wherein the splashguard includes a wall member, a flat end, and an open end;
   iii. wherein the splashguard is configured for communication with the open upper end of the elongated body, creating an open space between the inner wall of the splashguard and the inner wall of the elongated body, and
   iv. wherein the flat end of the splashguard rests within the elongated body at least 0.5 inches below the upper end of the elongated body.

2. The device of claim 1, wherein the splashguard is fixedly attached to the elongated body.

3. The device of claim 1, wherein the splashguard is removeably attached to the elongated body.

4. The device of claim 1, wherein the splashguard is configured to include a hole with four grooves radiating away from the hole of the splashguard.

5. The device of claim 1, wherein the splashguard is made of polychloroprene.

6. The device of claim 1, wherein the elongated body further includes a hole member and removable plug member configured on the lower end of the elongated body.

7. A device for cleaning an animal's paw comprising:
   i. an elongated body having a closed lower end and an open upper end, wherein the elongated body is configured so that the side wall flares out from the center toward the upper end and lower end;
   ii. a splashguard having a wall member, a flat end, and an open end, wherein the flat end further includes a hole and at least one groove radiating away from the hole of the flat end, and wherein the open end is configured for communication with the upper end of the elongated body and wherein the communication between the splashguard and elongated body creates a void space;
   iii. wherein the flat end of the splashguard rests within the elongated body at least 0.5 inches below the upper end of the elongated body; and
   iv. the splashguard is fixedly attached to the elongated body.

8. The device of claim 7, wherein the splashguard further includes a seam that attaches the flat end with the wall member.

* * * * *